United States Patent
Li et al.

(10) Patent No.: US 11,408,823 B2
(45) Date of Patent: Aug. 9, 2022

(54) TERAHERTZ SPECTRUM MEASUREMENT METHOD AND SYSTEM BASED ON UNEQUAL OPTICAL PATH METHOD

(71) Applicant: Shandong University of Science and Technology, Qingdao (CN)

(72) Inventors: Dehua Li, Qingdao (CN); Beibei Ji, Qingdao (CN); Zhaoxin Li, Qingdao (CN); Wei Zhou, Qingdao (CN); Binbin Song, Qingdao (CN); Qiuhong Cao, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/307,160

(22) Filed: May 4, 2021

(65) Prior Publication Data

US 2022/0107268 A1     Apr. 7, 2022

(30) Foreign Application Priority Data

Oct. 5, 2020   (CN) .......................... 202011067243.9

(51) Int. Cl.
  *G01N 21/3586*   (2014.01)
  *G02B 27/10*     (2006.01)

(52) U.S. Cl.
  CPC ..... *G01N 21/3586* (2013.01); *G02B 27/1006* (2013.01)

(58) Field of Classification Search
  CPC .................. G01N 21/3586; G02B 27/1006
  See application file for complete search history.

(56) References Cited

FOREIGN PATENT DOCUMENTS

WO     WO-2015073807 A1 *  5/2015  ............. G01B 11/06

OTHER PUBLICATIONS

Li et al (Research on Dielectric Properties of Gallium Arsenides by Using THzTDS ) Nov. 1, 2009 , SPIE-OSA-IEEE vol. 7631 76310O-6.*

* cited by examiner

*Primary Examiner* — David P Porta
*Assistant Examiner* — Fani Polyzos Boosalis
(74) *Attorney, Agent, or Firm* — Parsons Behle & Latimer

(57) ABSTRACT

Terahertz spectrum measurement method and system based on an unequal optical path method is provided. By using a Femtosecond laser and a Terahertz time-domain spectroscopy system, samples to be measured and having different thicknesses are subjected to scanning by time-domain Terahertz signals to obtain transmission signals of the samples with two different thicknesses. The signal after passing through a sample with the thickness of $d_1$ is a reference signal, and the signal after passing through a sample with the thickness of $d_2$ is a sample signal. When Terahertz waves are normally incident to the samples and having different thicknesses, the signals emitted from the samples have an optical path difference therebetween. Phase-containing frequency spectra are obtained after time-domain signals are subjected to Fourier transform. The parameters, such as a refractive index, an extinction coefficient, and an absorption coefficient, can be calculated through the extracted phase-containing frequency spectrums.

4 Claims, 2 Drawing Sheets

TERAHERTZ SPECTRUM MEASUREMENT METHOD AND SYSTEM BASED ON UNEQUAL OPTICAL PATH METHOD

TECHNICAL FIELD

The present disclosure relates to the technical field of Terahertz spectrum measurement, and in particular, to a Terahertz spectrum measurement method and system based on an unequal optical path method.

BACKGROUND

Terahertz time-domain spectroscopy is a new measurement technology after traditional spectroscopy, such as ultraviolet spectroscopy, infrared spectroscopy, circular dichroism, and X-ray. The technology can fill the gap of low frequency parts in traditional measurement technologies, and becomes a new method for studying the optical parameters, such as the absorption rate and refractive index, of a material in a Terahertz band, Terahertz spectroscopy has been applied to many fields, like biomolecule, chemical reaction, medicine, communication, safety inspection, and so on. At present, there are three measurement modes of samples by using a Terahertz time-domain spectrometer, namely a transmission mode, a reflection mode, and an attenuated total reflection mode. The traditional Terahertz time-domain spectroscopy system is composed of a femtosecond laser, a Terahertz pulse transmitter, a signal receiver, a time delay control system, and a set of signal processing system. In THz-TDS, Terahertz pulses are generated and detected by using a photo-conductive antenna. One beam of laser pulse is split into two beams of laser, which are respectively used as pump light for exciting a Terahertz pulse and detection light for detecting a Terahertz signal. When the Terahertz pulses pass through the air and a sample respectively, the pulse after passing through the air is recorded as a reference time-domain signal and the pulse after passing through the sample is recorded as a sample time-domain signal, and the waveforms of reference and sample time-domain signals are subjected to Fourier transform to obtain frequency-domain waveforms of the reference and the sample. The material parameters, such as the refractive index, the absorption coefficient, and the extinction coefficient, can be extracted through further processing.

In the traditional Terahertz time-domain spectrum measurement method, the Terahertz signal passing through the air is used as the reference signal, which is compared with the Terahertz signal passing through the sample to be measured, as a sample signal. The reference signal and the sample signal are subject to Fourier transform and other operations to obtain the refractive indexes, the extinction coefficients, the absorption coefficients, and the dielectric constants of a sample at different frequencies. Such traditional method results in obvious errors of the extracted refractive index and absorption coefficient of the material.

SUMMARY

The objective of some embodiments is to provide a Terahertz spectrum measurement method and system based on an unequal optical path method, which can improve the calculation accuracy of the refractive index and the absorption coefficient of a material.

To achieve the objective above, the present disclosure provides the following solution.

A Terahertz spectrum measurement method based on an unequal optical path method includes:

scanning samples with different thicknesses by time-domain Terahertz signals, transforming, through Fourier transform, time-domain signals containing sample information into frequency-domain spectrums, extracting amplitude and phase information from the frequency-domain spectrums, and calculating absorption coefficients and refractive indexes of the samples by using an unequal optical path method, wherein the Terahertz signal after passing through a sample with the thickness of $d_1$ is a reference signal, the signal after passing through a sample with the thickness of $d_2$ is a sample signal, and the samples to be measured and having different thicknesses are made of the same material.

Optionally, the scanning samples with different thicknesses by time-domain Terahertz signals, transforming, through Fourier transform, time-domain signals containing sample information into frequency-domain spectrums, extracting amplitude and phase information from the frequency-domain spectrums, and calculating absorption coefficients and refractive indexes of the samples by using an unequal optical path method specifically includes:

causing the Terahertz signals to be normally incident to a sample with the thickness of $d_1$ and a sample with the thickness of $d_2$ respectively, and calculating an intensity of the reference signal and an intensity of the sample signal;

calculating a difference value between $d_1$ and $d_2$, and calculating transfer function upon passing through the samples with the thicknesses of $d_1$ and $d_2$ according to the difference value, the intensity of the reference signal, and the intensity of the sample signal;

performing Fourier transform on the time-domain signals to obtain phase-containing frequency spectrums, where the time-domain signals are the time-domain Terahertz signals after passing through the samples with the thicknesses of $d_1$ and $d_2$;

calculating the absorption coefficients and the refractive indexes of the samples according to the transfer function upon passing through the samples with the thicknesses of $d_1$ and $d_2$ and the phase-containing frequency spectrums.

The present disclosure further provides a Terahertz spectrum measurement system based on an unequal optical path method, which includes a Terahertz spectrum measurement module.

The Terahertz spectrum measurement module is configured for scanning samples with different thicknesses by time-domain Terahertz signals, transforming time-domain signals which contain sample information into frequency-domain spectrums through Fourier transform, extracting amplitude and phase information from the frequency-domain spectrums, and calculating absorption coefficients and refractive indexes of the samples by using an unequal optical path method, wherein the Terahertz signal after passing through the sample with the thickness of $d_1$ is a reference signal, the Terahertz signal after passing through the sample with the thickness of $d_2$ is a sample signal, and the samples to be measured and having different thicknesses are made of the same material.

Optionally, the Terahertz spectrum measurement module specifically includes a Terahertz spectrum measurement unit, which is configured for causing the Terahertz signals to be normally incident to a sample with the thickness of $d_1$ and a sample with the thickness of $d_2$ respectively, and calculating an intensity of the reference signal and an intensity of the sample signal.

The Terahertz spectrum measurement unit is further configure for calculating a difference value between $d_1$ and $d_2$, and calculating transfer function upon passing through the samples with the thicknesses of $d_1$ and $d_2$ according to the difference value, the reference signal intensity, and the sample signal intensity.

The Terahertz spectrum measurement unit is further configured for performing Fourier transform on the time-domain signals to obtain phase-containing frequency spectrums, where the time-domain signals are time-domain Terahertz signals after passing through the samples with the thicknesses of $d_1$ and $d_2$.

The Terahertz spectrum measurement unit is further configured for calculating the absorption coefficients and the refractive indexes of the samples according to the transfer function upon passing through the samples with the thicknesses of $d_1$ and $d_2$ and the phase-containing frequency spectrums.

The present disclosure provides the Terahertz spectrum measurement method and system based on an unequal optical path method. (1) The unequal optical path method can effectively eliminate the measurement error caused by signal reflection between two mediums. (2) In the unequal optical path method, approximate treatment is not required to be performed, and an optical constant is calculated independently, so the material parameters, such as the refractive index and the absorption coefficient, can be calculated more accurately. Compared with the conventional methods, the unequal optical path method can reveal the material characteristic absorption peak that cannot be measured by the conventional methods. Compared with the conventional methods, the measurement accuracy is higher, and more advantages are achieved.

DETAILED DESCRIPTION

Figure 1:
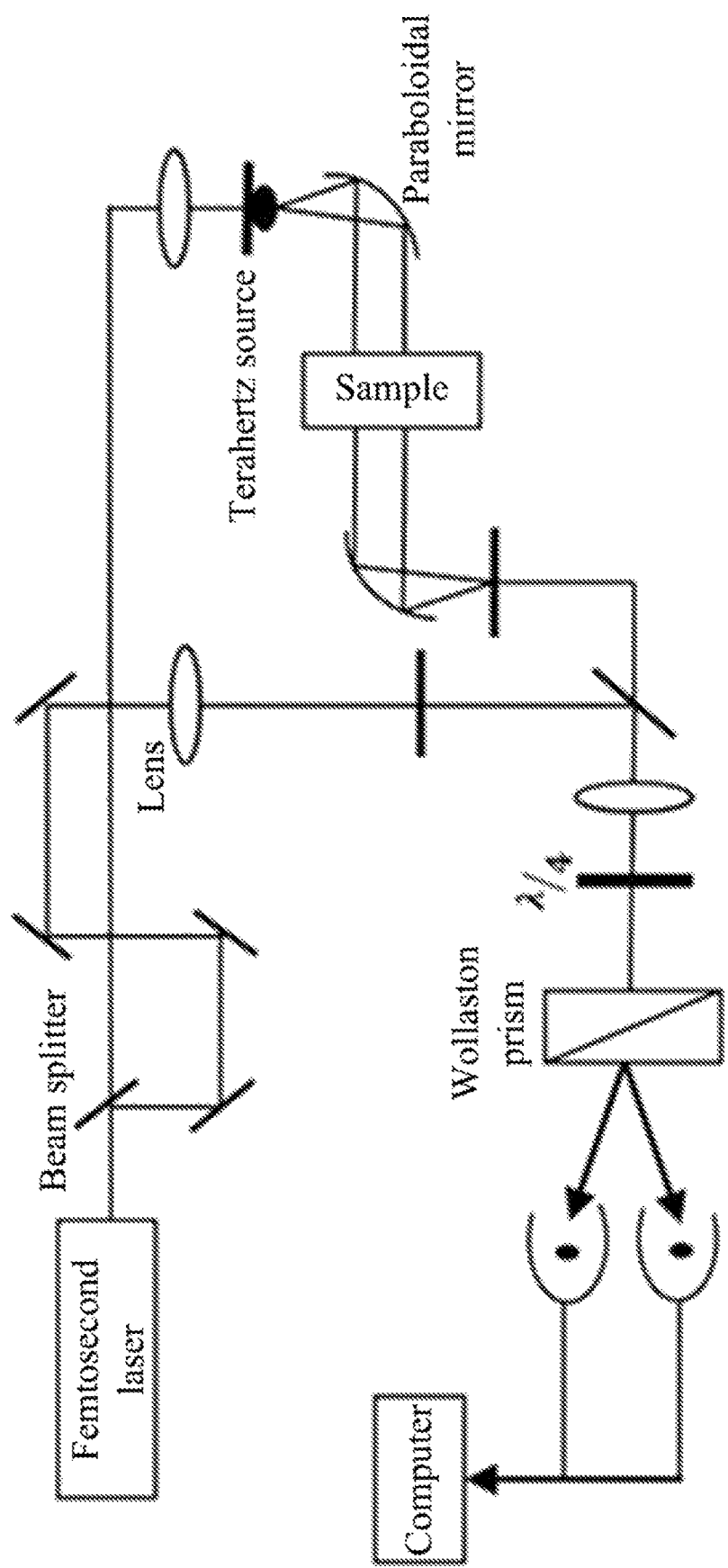
FIG. 1 is a schematic diagram of a Terahertz time-domain spectrum principle.

The technical solutions in the embodiments of the present disclosure will be clearly and completely described herein below with reference to the accompanying drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the protection scope of the present disclosure.

The objective of the present disclosure is to provide a Terahertz spectrum measurement method and system based on an unequal optical path method, which can improve the calculation accuracy of the refractive index and the absorption coefficient of a material.

In order to make the above objectives, features, and advantages of the present disclosure more apparent and more comprehensible, the present disclosure is further described in detail below with reference to the accompanying drawings and specific implementation manners.

The present disclosure provides a Terahertz spectrum measurement method based on an unequal optical path method, including: scanning samples with different thicknesses by time-domain Terahertz signals; transforming, through Fourier transform, time-domain signals containing sample information into frequency-domain spectrums; extracting amplitude and phase information; calculating the absorption coefficients and the refractive indexes of the samples by using an unequal optical path method, wherein the Terahertz signal after passing through a sample with the thickness of $d_1$ is a reference signal, the Terahertz signal after passing through a sample with the thickness of $d_2$ is a sample signal, and the samples to be measured and having different thicknesses are made of the same material.

Specifically, the Terahertz signal is normally incident to a sample with the thickness of $d_1$ and a sample with the thickness of $d_2$ respectively. And an intensity of the reference signal and an intensity of the sample signal are calculated.

Subsequently, a difference value between $d_1$ and $d_2$ is calculated, and transfer function upon passing through the samples with the thicknesses of $d_1$ and $d_2$ is calculated according to the difference value, the reference signal intensity, and the sample signal intensity.

Then, Fourier transform is performed on the time-domain signals to obtain phase-containing frequency spectrums, where the time-domain signals are Terahertz time-domain signals after passing through the samples with the thicknesses of $d_1$ and $d_2$.

Next the absorption coefficients and the refractive indexes of the samples are calculated according to the transfer function upon passing through the samples with the thicknesses of $d_1$ and $d_2$ and the phase-containing frequency spectrums.

The present disclosure further provides a Terahertz spectrum measurement system based on an unequal optical path method, which includes a Terahertz spectrum measurement module. The Terahertz spectrum measurement module is configured for scanning samples with different thicknesses by time-domain Terahertz signal; transforming time-domain signals which contain sample information into frequency-domain spectrums, through Fourier transform; extracting amplitude and phase information; and calculating the absorption coefficients and the refractive indexes of the samples by using an unequal optical path method, wherein the Terahertz signal after passing through the sample with the thickness of $d_1$ is a reference signal, the Terahertz signal after passing through the sample with the thickness of $d_2$ is a sample signal, and the samples to be measured and having different thicknesses are made of the same material.

The Terahertz spectrum measurement module specifically includes a Terahertz spectrum measurement unit.

The Terahertz spectrum measurement unit is configured for causing the Terahertz light to be normally incident to a sample with the thickness of $d_1$ and a sample with the thickness of $d_2$ respectively, and calculating an intensity of the reference signal and an intensity of sample signal.

The Terahertz spectrum measurement unit is further configured for calculating a difference value between $d_1$ and $d_2$, and calculating transfer function upon passing through the samples with the thicknesses of $d_1$ and $d_2$ according to the difference value, the intensity of the reference signal, and the intensity of the sample signal.

The Terahertz spectrum measurement unit is further configured for performing Fourier transform on the time-domain signals to obtain Phase-containing frequency spectrums, where the time-domain signals are time-domain Terahertz signals after passing through the samples with the thicknesses of $d_1$ and $d_2$.

The Terahertz spectrum measurement unit is further configured for calculating the absorption coefficients and the refractive indexes of the samples according to the transfer function upon passing through the samples with the thicknesses of $d_1$ and $d_2$ and the phase-containing frequency spectrums.

The Terahertz spectrum measurement method and system based on an unequal optical path method of the present disclosure can calculate the material parameters, such as the refractive index and the absorption coefficient, more accurately, and can reveal the material characteristic peak that cannot be measured by the conventional methods. The samples to be measured and having different thicknesses are subjected to scanning by time-domain Terahertz signal. The Terahertz signal after passing through the sample with the thickness of $d_1$ is a reference signal, and the Terahertz signal after passing through the sample with the thickness of $d_2$ is a sample signal. Signals obtained from Terahertz signals, which are normally incident to samples with different thicknesses, have an optical path difference therebetween. Phase-containing frequency spectrums are obtained, after the time-domain signals are subjected to Fourier transform. The material parameters with higher accuracy are obtained through the optical path difference and the extracted phase-containing frequency spectrums.

To achieve the objective above, the present disclosure adopts the following technical solutions.

First, a reference signal and a sample signal are obtained. Specifically, two samples having different thicknesses and made of the same material are respectively placed on a transmissive Terahertz time-domain spectroscopy system for being measured, so as to obtain a reference signal and a sample reference; the Terahertz signal after passing through the sample with the thickness of $d_1$ is a reference signal, and the Terahertz signal after passing through the sample with the thickness of $d_2$ is a sample signal.

Second, sample parameters are extracted by the equal optical path method. Specifically, the time-domain signals formed by the Terahertz pulses and having the sample information are transformed into frequency-domain spectra through Fourier transform; the amplitude and phase information are extracted; the parameters, such as the absorption parameters and the refractive indexes, of the samples are calculated by using the unequal optical path method.

Embodiment 1

An experimental solution for obtaining the reference signal and the sample signal is now described. The experimental solution for obtaining the reference signal and the sample signal by using transmissive Terahertz time-domain spectroscopy is as shown in FIG. 1. The laser transmitted from a femtosecond laser is split, by a beam splitter, into two parts, namely, a pump pulse and a detection pulse. The pump pulse is incident to a Terahertz radiation generating device after passing through a time delay device translation table, so as to generate a Terahertz pulse. Then, the Terahertz pulse transmitted from the Terahertz radiation generating device passes through a fixed experimental sample to be measured, at this time the Terahertz pulse contains the information of the experimental sample. Finally, the Terahertz pulse and the detection pulse are incident to a transmissive detection device colinearly together. A complete waveform of the Terahertz pulse with the sample information in the whole experimental time domain can be obtained by adjusting the time delays of the pump pulse and the detection pulse.

Embodiment 2

Figure 2:
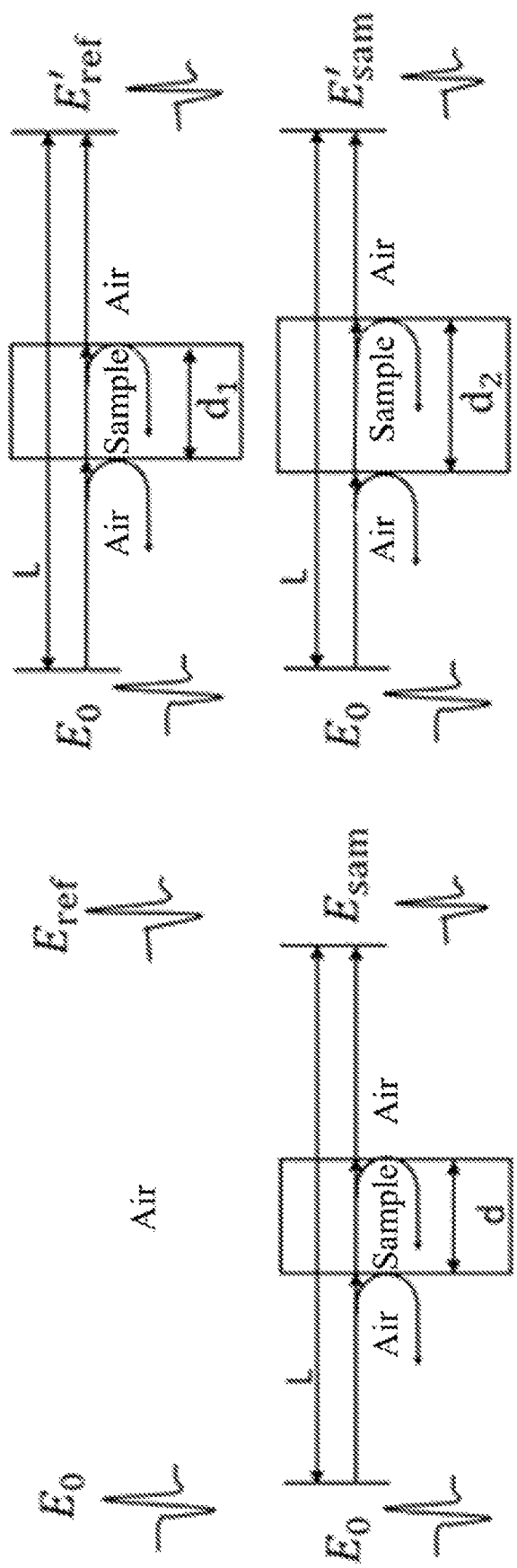
FIG. 2 is a schematic diagram of Terahertz transmission measurement.

A sample parameter extraction solution by the unequal optical path method is now described. The principle of extracting optical parameters of a sample in a Terahertz band by using Terahertz time-domain spectroscopy based on the unequal optical path method is as shown in FIG. 2. The left figure shows a measurement principle of a conventional transmission Terahertz time-domain spectroscopy. The distance between a transmitter and a detector is L. The Terahertz signal after passing through Air is used as a reference signal $E_{ref}$, and the Terahertz signal after passing through sample with a thickness of d is used as a sample signal $E_{sam}$. The right Figure is a schematic diagram of transmissive Terahertz time-domain spectrum measurement based on the unequal optical path method. Two samples having different thicknesses and made of the same material are obtained for being measured. The Terahertz signal after passing through the sample with the thickness of $d_1$ is a reference signal $E_{ref'}$, and the Terahertz signal after passing through the sample with the thickness of $d_2$ is a sample signal $E_{sam'}$.

The two samples having different thicknesses and made of the same material are measured successively. The thicknesses of the samples are respectively set as $d_1$ and $d_2$, ($d_2 > d_1$), and assuming that only normal incident signal is considered and reflected signal is ignored, an intensity of the reference signal and an intensity of the sample signal are expressed as follows:

$$E'_{ref} = E_0 \cdot e^{-in_0\omega(L-d_1)/c} \cdot t_{01} \cdot e^{-i\tilde{n}_1\omega d_1/c} \cdot t_{10} \quad (1)$$

$$E'_{sam} = E_0 \cdot e^{-in_0\omega(L-d_2)/c} \cdot t_{01} \cdot e^{-i\tilde{n}_1\omega d_1/c} \cdot t_{10} \quad (2)$$

where, $\Delta d = d_2 - d_1$. The transfer function upon passing through materials with thicknesses of $d_1$ and $d_2$ can be obtained by using the formulas (1) and (2).

$$H'(\omega) = \frac{E'_{sam}}{E'_{ref}} = \frac{e^{-in_1\omega\Delta d/c}}{e^{-in_0\omega\Delta d/c}} = e^{-i(n_1-n_0)\omega\Delta d/c} \cdot e^{-ik_1\omega\Delta d/c} \quad (3)$$

The phase-containing frequency spectrums are obtained after time-domain sample signals are subjected to Fourier transform. The ratio is written in an exponential form:

$$H(\omega) = \frac{E_{sam}}{E_{ref}} = \rho e^{-i\phi} \quad (4)$$

Through the formulas (3) and (4), the refractive index, the extinction coefficient, and the absorption coefficient of the sample are as follows respectively:

$$n_1 = \frac{c\phi}{\omega\Delta d} + 1 \quad (5)$$

$$k_1 = \frac{c}{\omega\Delta d}\ln\frac{1}{\rho} \quad (6)$$

$$\alpha_1 = \frac{2\omega}{c}k_1 = \frac{2}{\Delta d}\ln\frac{1}{\rho} \quad (7)$$

What is claimed is:
1. A Terahertz spectrum measurement method based on an unequal optical path method, comprising:
scanning samples with different thicknesses by time-domain Terahertz signals,
transforming time-domain signals containing sample information into frequency-domain spectrums through Fourier transform, extracting amplitude and phase information from the frequency-domain spectrums, and calculating absorption coefficients and refractive indexes of the samples by using an unequal optical path method, wherein the Terahertz signal after passing through a sample with the thickness of $d_1$ is a reference signal, the Terahertz signal after passing through a sample with the thickness of $d_2$ is a sample signal, and the samples to be measured and having different thicknesses are made of the same material.

2. The Terahertz spectrum measurement method based on an unequal optical path method according to claim 1, wherein the scanning samples with different thicknesses by time-domain Terahertz signals, transforming time-domain signals containing sample information into frequency-domain spectrums through Fourier transform, extracting amplitude and phase information from the frequency-domain spectrums, and calculating absorption coefficients and refractive indexes of the samples by using an unequal optical path method specifically, comprises:

causing the Terahertz signals to be normally incident to the sample with the thickness of $d_1$ and the sample with the thickness of $d_2$ respectively, and calculating an intensity of the reference signal and an intensity of the sample signal;

calculating a difference value between $d_1$ and $d_2$, and calculating transfer function upon passing through the samples with thicknesses of $d_1$ and $d_2$ according to the difference value, the intensity of the reference signal, and the intensity of the sample signal;

performing Fourier transform on the time-domain signals to obtain phase-containing frequency spectrums, wherein the time-domain signals are time-domain Terahertz signals after passing through the samples with the thicknesses of $d_1$ and $d_2$;

calculating the absorption coefficients and the refractive indexes of the samples according to the transfer function upon passing through the samples with the thicknesses of $d_1$ and $d_2$ and the phase-containing frequency spectrums.

3. A Terahertz spectrum measurement system based on an unequal optical path method, comprising a Terahertz spectrum measurement module configured for:

scanning samples with different thicknesses by time-domain Terahertz signals, transforming time-domain signals which contain sample information into frequency-domain spectrums through Fourier transform, extracting amplitude and phase information from the frequency-domain spectrums, and calculating absorption coefficients and refractive indexes of the samples by using an unequal optical path method, wherein the Terahertz signal after passing through the sample with the thickness of $d_1$ is a reference signal, the Terahertz signal after passing through the sample with the thickness of $d_2$ is a sample signal, and the samples to be measured and having different thicknesses are made of the same material.

4. The Terahertz spectrum measurement system based on an unequal optical path method according to claim 3, wherein the Terahertz spectrum measurement module specifically comprises:

a Terahertz spectrum measurement unit configured for causing the Terahertz signals to be normally incident to a sample with the thickness of $d_1$ and a sample with the thickness of $d^2$ respectively, and calculating an intensity of reference signal and an intensity of sample signal;

wherein the Terahertz spectrum measurement unit is further configured for calculating a difference value between $d_1$ and $d_2$, and calculating transfer function upon passing through the samples with the thicknesses of $d_1$ and $d_2$ according to the difference value, the intensity of the reference signal, and the intensity of the sample signal;

the Terahertz spectrum measurement unit is further configured for performing Fourier transform on the time-domain signals to obtain phase-containing frequency spectrums, wherein the time-domain signals are time-domain Terahertz signals after passing through the samples with the thicknesses of $d_1$ and $d_2$;

the Terahertz spectrum measurement unit is further configured for calculating the absorption coefficients and the refractive indexes of the samples according to the transfer function upon passing through the samples with the thicknesses of $d_1$ and $d_2$ and the phase-containing frequency spectrums.

* * * * *